United States Patent
Tonietto et al.

(10) Patent No.: US 9,515,785 B2
(45) Date of Patent: Dec. 6, 2016

(54) SYSTEM AND METHOD FOR DETECTING LOSS OF SIGNAL

(71) Applicants: Davide Tonietto, Ottawa (CA); Henry Wong, Ottawa (CA)

(72) Inventors: Davide Tonietto, Ottawa (CA); Henry Wong, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/567,068

(22) Filed: Dec. 11, 2014

(65) Prior Publication Data

US 2016/0173240 A1    Jun. 16, 2016

(51) Int. Cl.
| | |
|---|---|
| H04B 3/46 | (2015.01) |
| H04B 17/00 | (2015.01) |
| H04L 1/20 | (2006.01) |
| H04L 27/01 | (2006.01) |
| H04L 7/00 | (2006.01) |

(52) U.S. Cl.
CPC .............. H04L 1/20 (2013.01); H04L 7/0033 (2013.01); H04L 27/01 (2013.01)

(58) Field of Classification Search
CPC .......... H04L 1/20; H04L 43/16; H04L 7/0333; H04L 7/0083; H04L 27/01; H04B 17/318
See application file for complete search history.

(56) References Cited

U.S. PATENT DOCUMENTS

| | | | |
|---|---|---|---|
| 6,353,341 B1 * | 3/2002 | Lesea ............... | G01R 31/31937 327/205 |
| 6,377,082 B1 | 4/2002 | Loinaz et al. | |
| 6,489,803 B1 | 12/2002 | Steiner et al. | |
| 7,254,169 B1 * | 8/2007 | Steiner ............... | H03F 3/45183 327/52 |
| 2012/0327818 A1 * | 12/2012 | Takatori ................... | H04L 5/14 370/277 |
| 2014/0185633 A1 * | 7/2014 | Mills ..................... | H04L 7/0337 370/517 |

(Continued)

OTHER PUBLICATIONS

International Patent Application No. PCT/CN2015/096170, International Search Report and Written Opinion dated Mar. 3, 2016.

(Continued)

*Primary Examiner* — David B. Lugo

(57) ABSTRACT

Apparatus and methods are taught for quickly determining whether a Loss of Signal (LOS) condition has occurred for a receiver which includes an internal reference clock, a LOS circuit and a Clock and Data Recovery (CDR) circuit. The CDR circuit recovers the clock and data of an incoming signal. However, the LOS circuit can determine whether a received incoming signal includes an active signal, independent of said CDR circuit such that it samples said incoming signal utilizing said internal reference clock to determine a loss of signal prior to said CDR recovering the clock of said incoming signal. The LOS circuit includes an analog voltage threshold stage which samples the incoming signal, and produces at least one sample stream indicative of transitions in the incoming signal. The LOS circuit further includes a digital transition stage which counts transitions in order to discriminate between an active signal and noise.

20 Claims, 8 Drawing Sheets

(56) References Cited

U.S. PATENT DOCUMENTS

2014/0192841 A1* 7/2014 Zhan .................. H04L 1/20
 375/130
2015/0032788 A1* 1/2015 Velazquez ............. H04L 27/265
 708/819

OTHER PUBLICATIONS

LV Xiaohua et al. "A 6Gbps/channel CML Receiver with Loss of Signal Detection for Chip-to-Chip Communication", ICCP2011 Proceedings, 2011 IEEE, pp. 33-36.

Kawar Sanad et al. "A 10 Gbps Loss of Signal Detector for High-Speed AC-Coupled Serial Transceivers in 28nm CMOS Technology", 2014 IEEE.

R. Walker, C. Stout, C-S Yen, FP 15.5: A 2.488Gb/s Si-Bipolar Clock and Data Recovery IC with Robust Loss of Slgnall, Detection, 1997 IEEE.

Maxim Integrated, Design Note: HFDN-34.0 (Rev. 1; 04/08), Accurate Loss-of-Signal Detection in 10 Gbps Optical Receivers using the MAX3991, pp. 1-5.

* cited by examiner

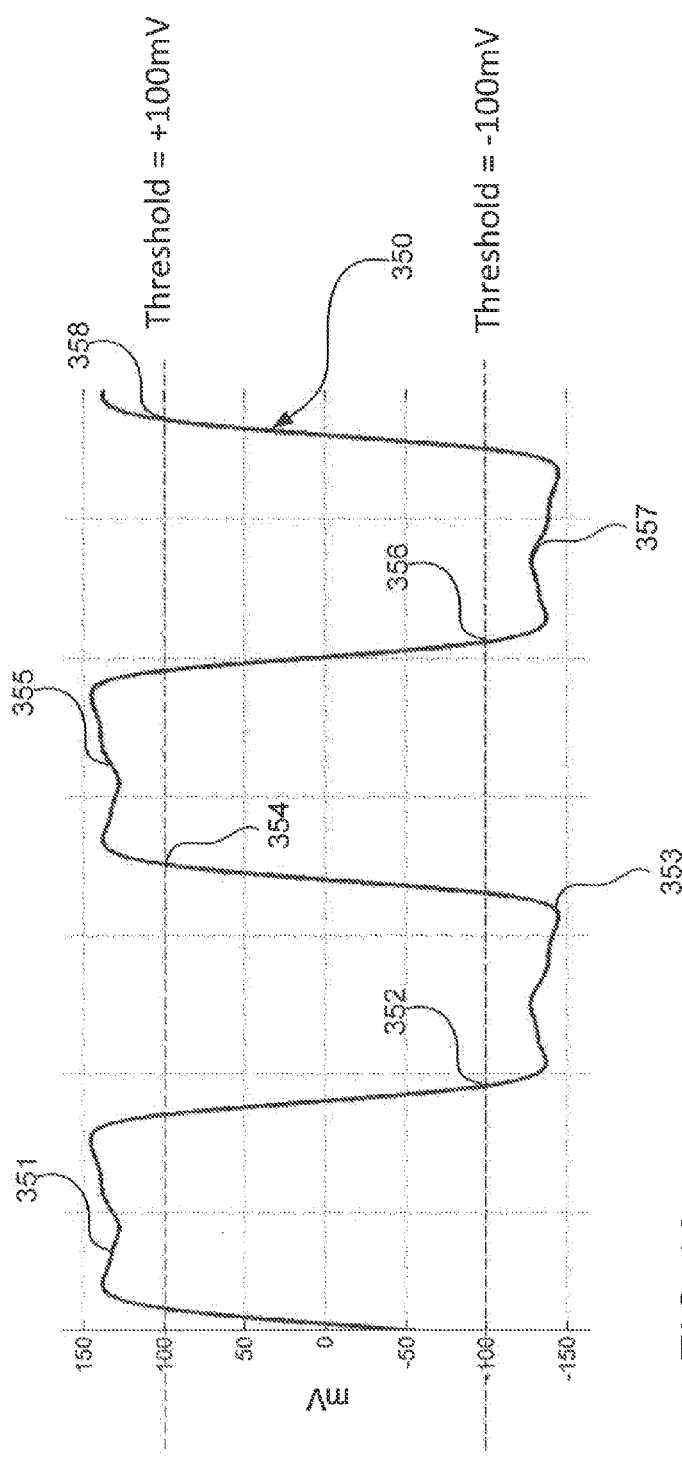
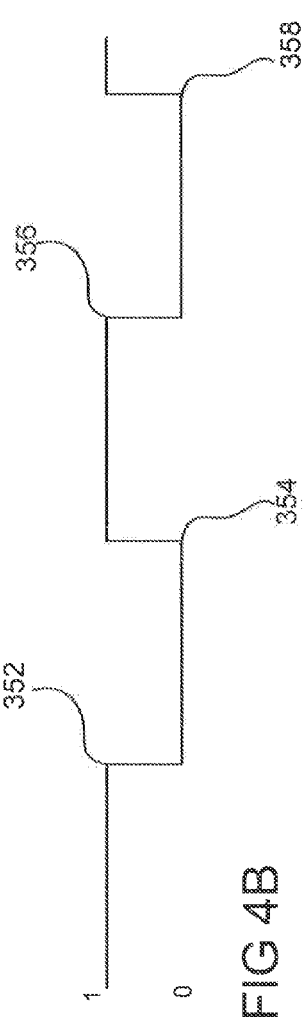
FIG 4A
FIG 4B

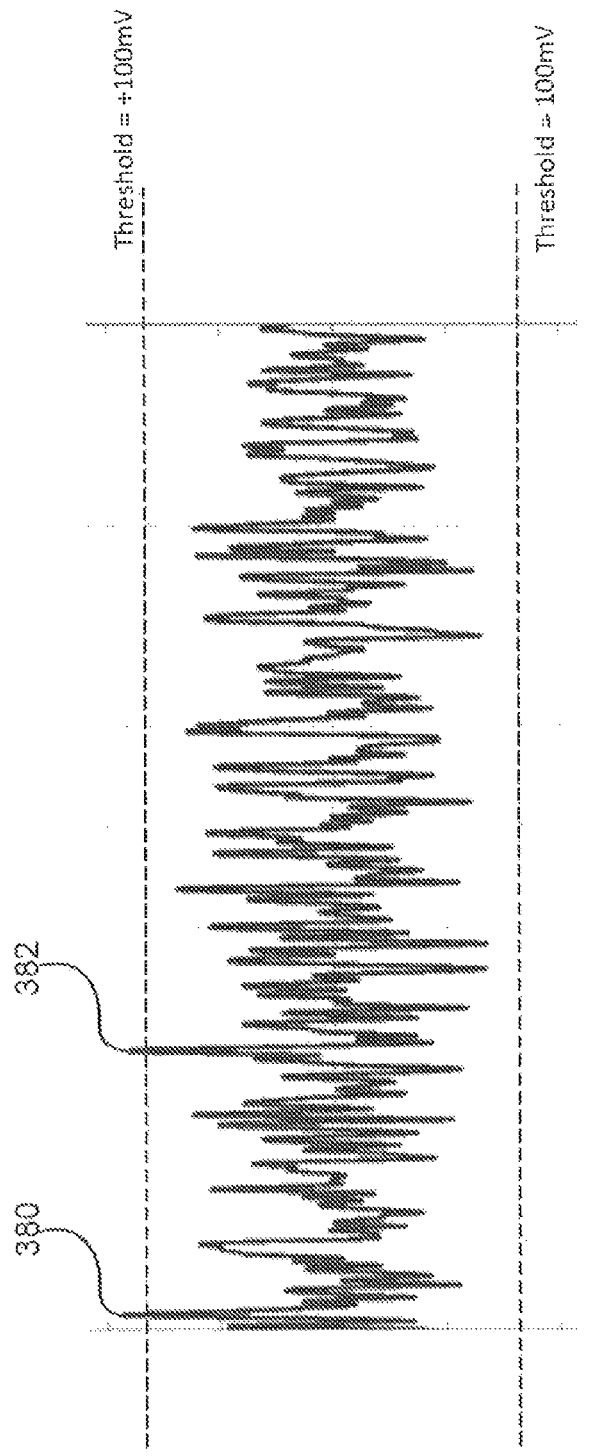

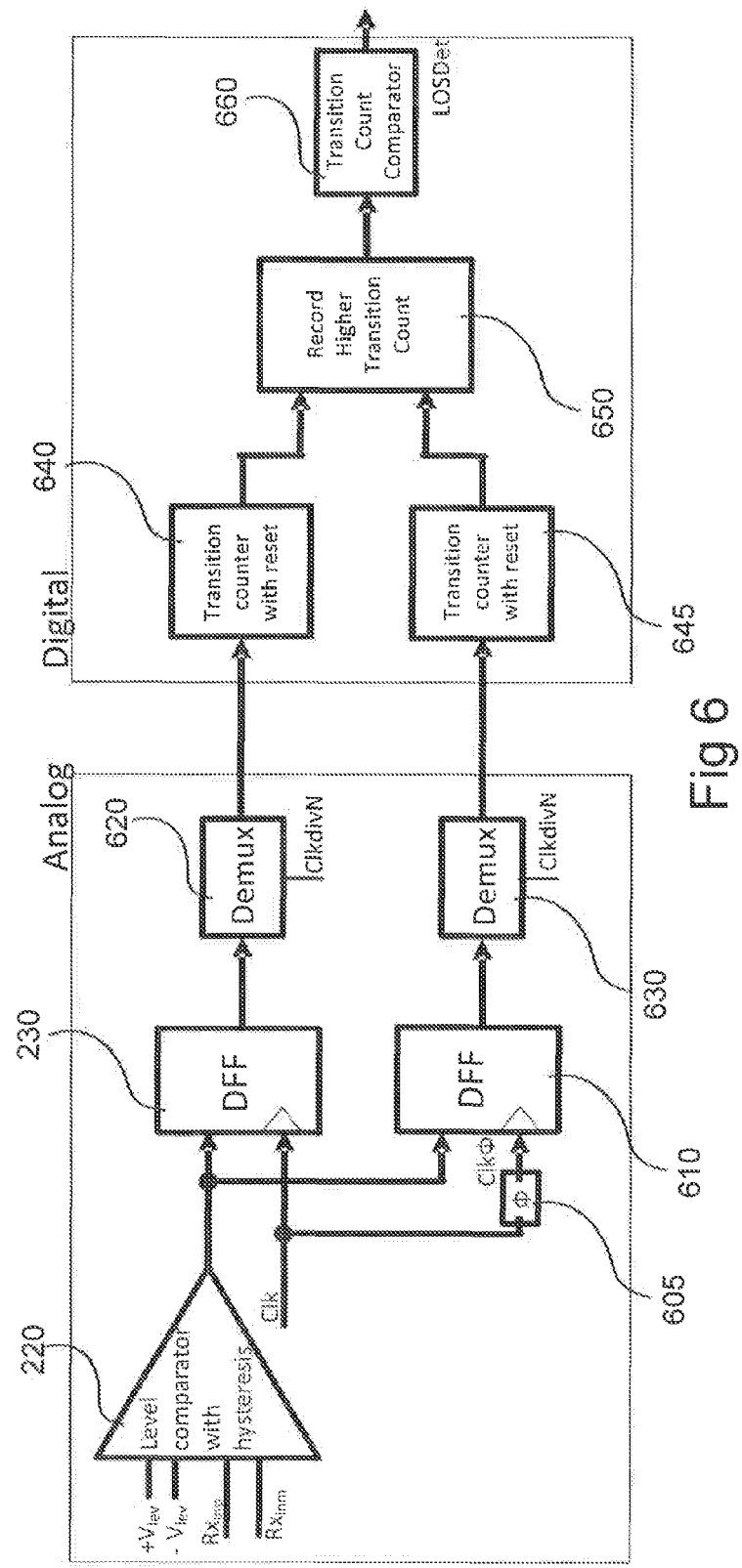

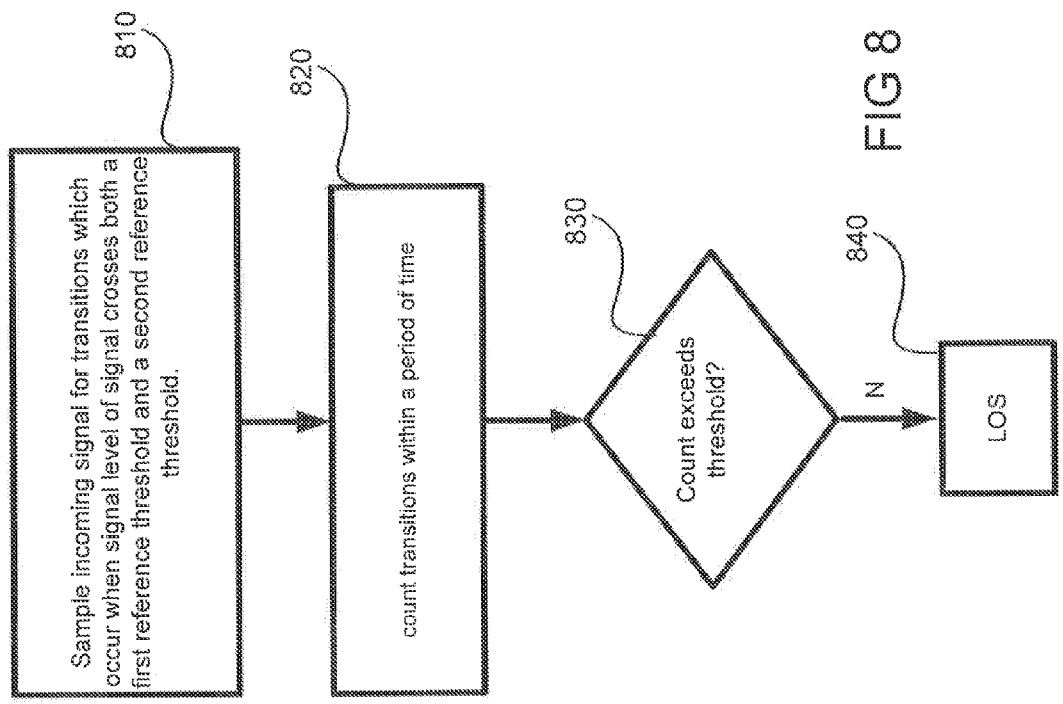

SYSTEM AND METHOD FOR DETECTING LOSS OF SIGNAL

TECHNICAL FIELD

This disclosure relates to systems for detecting the loss of a signal.

BACKGROUND

Receivers designed to receive transmitted signals often need to determine whether a signal they are supposed to receive from a transmitter is present. This can be a challenge, as the receiver may still "receive" a "signal" which is not actually an active signal transmitted by a transmitter, but instead constitutes noise. Loss of Signal (LOS) circuits exist which attempt to detect a loss of signal.

However, there is a need for an improved LOS circuit which can quickly detect such a LOS condition.

SUMMARY

Aspects of the disclosure provide a system and method for quickly determining whether a Loss of Signal (LOS) condition has occurred.

A first aspect of the disclosure provides a receiver which includes a signal receive interface for receiving an incoming signal, an internal reference clock source, and an LOS circuit. The internal reference clock source produces an internal reference clock signal which is asynchronous to a clock rate of said incoming signal. For example, the internal reference clock signal need not be locked in frequency or phase to a clock signal which generated any active signal present in said incoming signal. The LOS circuit samples the incoming signal utilizing said internal reference clock signal to determine whether a loss of signal condition has occurred.

An embodiment includes a clock recovery circuit, for example a Clock and Data Recovery (CDR) circuit. The CDR circuit recovers the clock and data of an incoming signal. However, the LOS circuit can determine whether a received incoming signal includes an active signal, by sampling the incoming signal utilizing the internal reference clock to determine a loss of signal without requiring the clock recovery circuit recover the clock of said incoming signal. In an embodiment the LOS circuit includes two stages, an analog threshold stage and a digital transition stage. The analog threshold stage samples the incoming signal, and produces a sample stream indicative of transitions in the incoming signal. The digital transition stage counts transitions in the sample stream in order to discriminate between an active signal and a LOS condition. In an embodiment, the analog threshold stage is configured to sample the incoming signal to produce samples indicative of transitions which occur when the signal level of the incoming signal crosses both a first reference threshold, and a second reference threshold. To improve the robustness of such a system, an embodiment produces at least one additional sample stream, sampled with a phase shifted internal reference clock, to increase the likelihood that transitions which occur are detected by the system.

Another aspect of the disclosure provides for an LOS circuit which includes an analog threshold stage and a digital transition stage to process an incoming signal. The analog threshold stage utilizes a reference clock which is asynchronous to a clock rate of the incoming signal to sample the incoming signal, and produces at least one sample stream indicative of transitions in the incoming signal. The digital transition stage counts transitions in the at least one sample stream in order to discriminate between an active signal and a LOS condition. Such an LOS circuit can be used in a receiver which includes an internal reference clock and a Clock and Data Recovery circuit (CDR) for recovering the clock of an incoming signal. Such an LOS circuit is configured to operate independent of said CDR circuit and determines whether a loss of signal condition exists or not prior to said CDR recovering said clock of said incoming signal.

Another aspect of the disclosure provides for a method of detecting a Loss of Signal (LOS) condition carried out by a receiver. Such a method includes sampling an incoming signal, using an asynchronous internal reference clock internal to the receiver, for transitions which occur when the signal level of the incoming signal crosses both a first and second reference threshold. The method then counts the number of transitions within a period of time and compares the counted number of transitions with a threshold to discriminate between an active signal and a LOS condition. The asynchronous internal reference clock is asynchronous to a clock which generated an active signal if one is present in the incoming signal. For example, the asynchronous clock need not be synchronized in phase or frequency to a clock which generated any such active signal.

The foregoing and other objects, features, aspects and advantages of the present disclosure will become more apparent from the following detailed description, taken in conjunction with the accompanying drawings which description is by way of example only.

BRIEF DESCRIPTION OF DRAWINGS

FIG. 4A illustrates another signal which has a low frequency data pattern and FIG. 4B illustrates the corresponding comparator output according to an embodiment;

FIG. 5A illustrates a noise signal and FIG. 5B illustrates the corresponding comparator output according to an embodiment;

FIG. 6 is a block diagram illustrating schematically another embodiment of an LOS circuit;

FIG. 8 is a flow chart illustrating a method of detecting a LOS condition carried out by a receiver, according to an embodiment.

DESCRIPTION OF EMBODIMENTS

Embodiments provide Loss of Signal (LOS) detection systems and methods which can distinguish a valid (i.e., an active) signal from noise (which for simplicity will be used in this specification to include an invalid signal, noise, or a non-existing signal). Embodiments will be discussed with respect to implementations particularly suited for high-speed backplane environments, in which the received signal amplitude can be relatively small, while crosstalk noise can be relatively high. However, the principles discussed herein are not limited to backplane environments, and can be applicable generally to receivers which require LOS.

Figure 1:
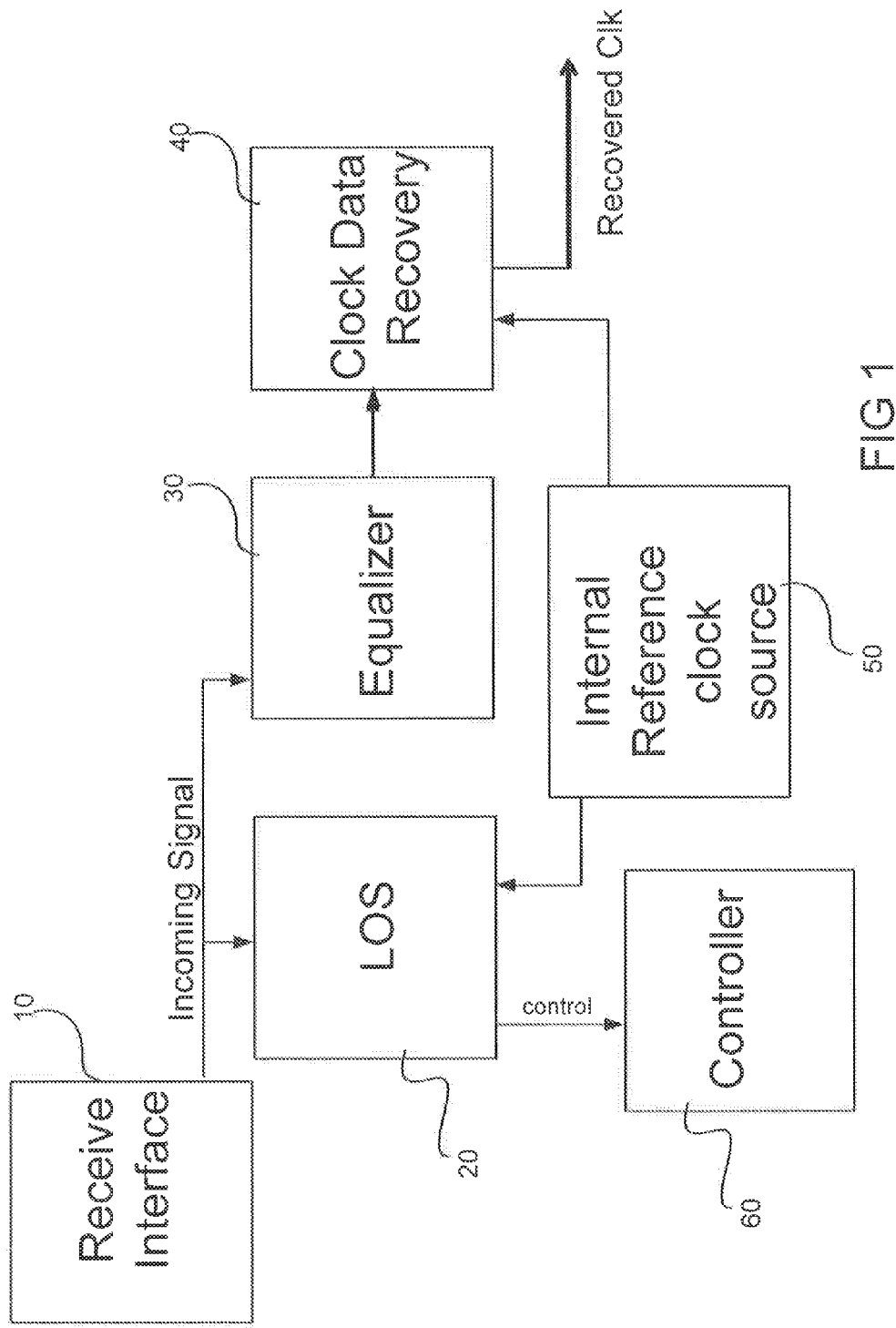
FIG. 1 is a block diagram illustrating a receiver according to an embodiment.

FIG. 1 is a block diagram illustrating a receiver according to an embodiment. The receiver includes a receive interface 10 which forwards an incoming signal to a LOS circuit 20 and an Equalizer 30. The receiver also includes a clock recovery circuit, for example Clock and Data Recovery (CDR) circuit 40, and an internal reference clock source 50. The Equalizer 30, for example a continuous-time linear equalizer, operates in a conventional manner to reverse distortion (e.g., inter-symbol interference) incurred during transmission through the channel. It should be appreciated that not all receivers will require an equalizer, depending on the transmission medium involved. For embodiments which do not require an equalizer, the incoming signal may be forwarded to both the LOS 20 and the CDR 40. In this embodiment, the LOS circuit 20 processes the incoming signal in parallel to the Equalizer 30, and before the CDR 40. In other words, the LOS Circuit 20 can determine a LOS condition without first requiring the receiver to either equalize the signal or recover the incoming signal clock. This allows for faster LOS detection than prior art systems which perform LOS as part of, or after, CDR.

The LOS circuit 20 determines if the received incoming signal 10 includes an active signal (as opposed to simply noise). LOS circuit 20 is configured to operate independently of said CDR circuit 40 such that it samples said incoming signal utilizing an internal reference clock signal received from the internal reference clock source 50 to determine a loss of signal based on an incoming signal that has not been processed by the CDR circuit 40. As a result, in some embodiments the LOS determination may be made prior to said CDR 40 recovering said clock of said incoming signal. While only a single incoming signal is shown, it should be appreciated that embodiments, like the further embodiments discussed below, can operate for receivers which are configured to receive differential incoming signals with positive and negative components. Internal reference clock signal refers to a clock signal derived from an internal clock component, without needing to be locked in frequency or phase to the clock of the incoming signal. The clock component may produce an initial clock signal which is processed (e.g., upconverted or divided) to produce the internal reference clock signal of a desired rate.

Depending on the application, the receiver may also include one or more termination blocks, not shown, to match the receiver impedance to the transmission line(s), in order to minimize reflections back to the transmitter. As should be appreciated, for differential signaling, both the positive and negative signal components should be terminated.

The LOS output is sent to receiver controller 60, which can send appropriate alarms, and take appropriate remedial action when a LOS condition is determined. One advantage of such an embodiment is that it can detect a LOS condition faster that prior art systems which detect a LOS after CDR, and can therefore respond earlier than such prior art systems.

Figure 2:
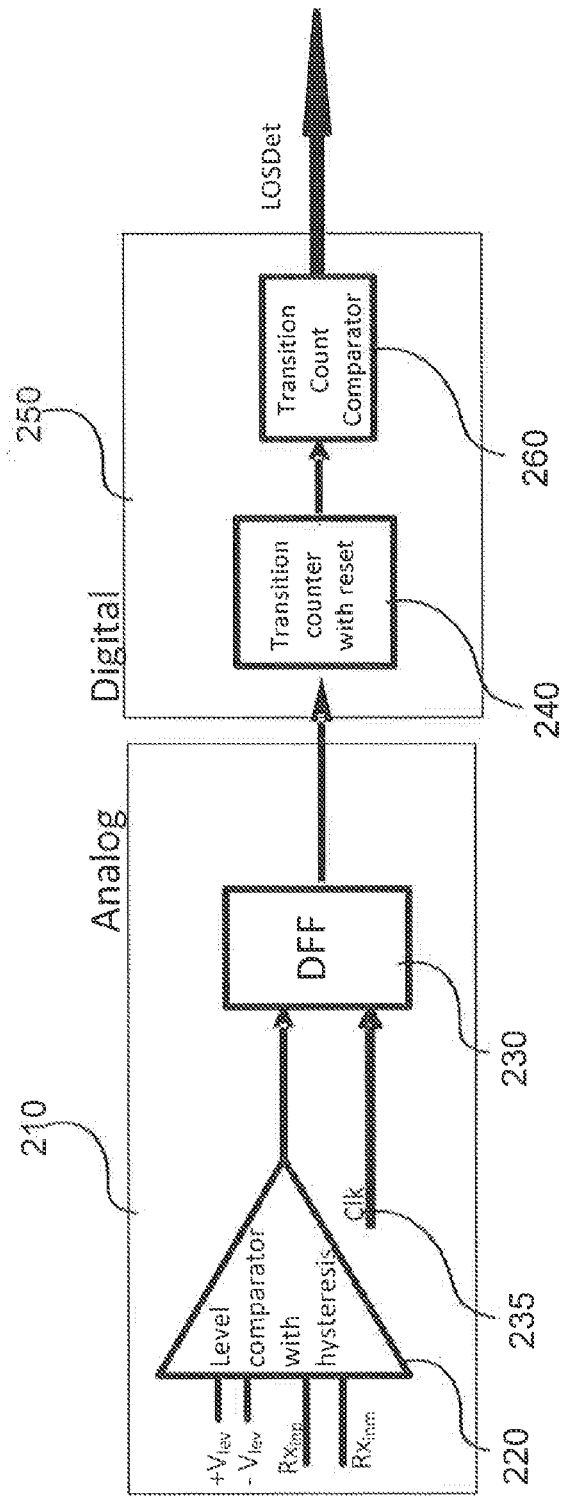
FIG. 2 is a block diagram illustrating an embodiment of the Loss of Signal (LOS) circuit of FIG. 1.

FIG. 2 is a block diagram illustrating an embodiment of the LOS circuit of FIG. 1. The embodiment of FIG. 2 is discussed with respect to an example of LOS detection for a receiver configured to receive a differential signal. However, the system is not limited to differential signaling. The LOS circuit in this example includes two stages. The first stage is an analog threshold voltage stage 210 that samples said incoming signal, and produces a sample stream indicative of transitions in the incoming signal. The second stage is a digital transition stage 250 that counts transitions in the sample stream in order to discriminate between an active signal and noise.

The analog stage 210 includes a level comparator with hysteresis 220, which compares the incoming signal against a first threshold and second threshold (which in some embodiments may be the positive and negative values of a single threshold). In this embodiment, due to the differential signaling, comparator 220 receives the differential plus (p) and minus (m) inputs $Rx_{inp}$ and $Rx_{inm}$.

In an embodiment, the comparator 220 produces an output indicative of when the voltage of said incoming signal crosses the reference voltages. As the comparator 220 has both a positive and negative reference voltage ($V_{lev}$), a transition occurs as the change in the voltage of the signal crosses both the positive and negative reference voltages. We will discuss transitions in more detail below. The output of the comparator will stay constant (either 1 or 0, depending on is previous state) until a voltage transition occurs, at which point it will switch values, and remain at that new value until the next transition occurs. The output of the comparator is sampled by a Data Flip-Flop (DFF) 230, to produce a sample stream indicative of the transitions that occur in the incoming signal. The DFF 230 samples the comparator output based on an internal reference clock (Clk) 235, which is asynchronous to the clock of the incoming signal. The Clk 235 is said to be asynchronous, as it does not need to be synchronized (either in frequency or phase) to the clock of the incoming signal.

The output from DFF 230 is a digital sample stream, which is then processed by the digital transition stage 250. The digital transition stage 250 includes a transition counter (with reset) 240, which counts transitions in the sample stream output received from the DFF 230. The counter 240 counts the number of times the sample stream changes (from a 1 to 0 or from 0 to 1) within a period of time (between resets). The transition count comparator 260 compares the counted number of transitions with a threshold to discriminate between an active signal and noise. If the number of transitions between resets exceeds the threshold, then an active signal is presumed. Otherwise, a LOS is detected, resulting in a LOSDet alarm being output.

Figure 3A:
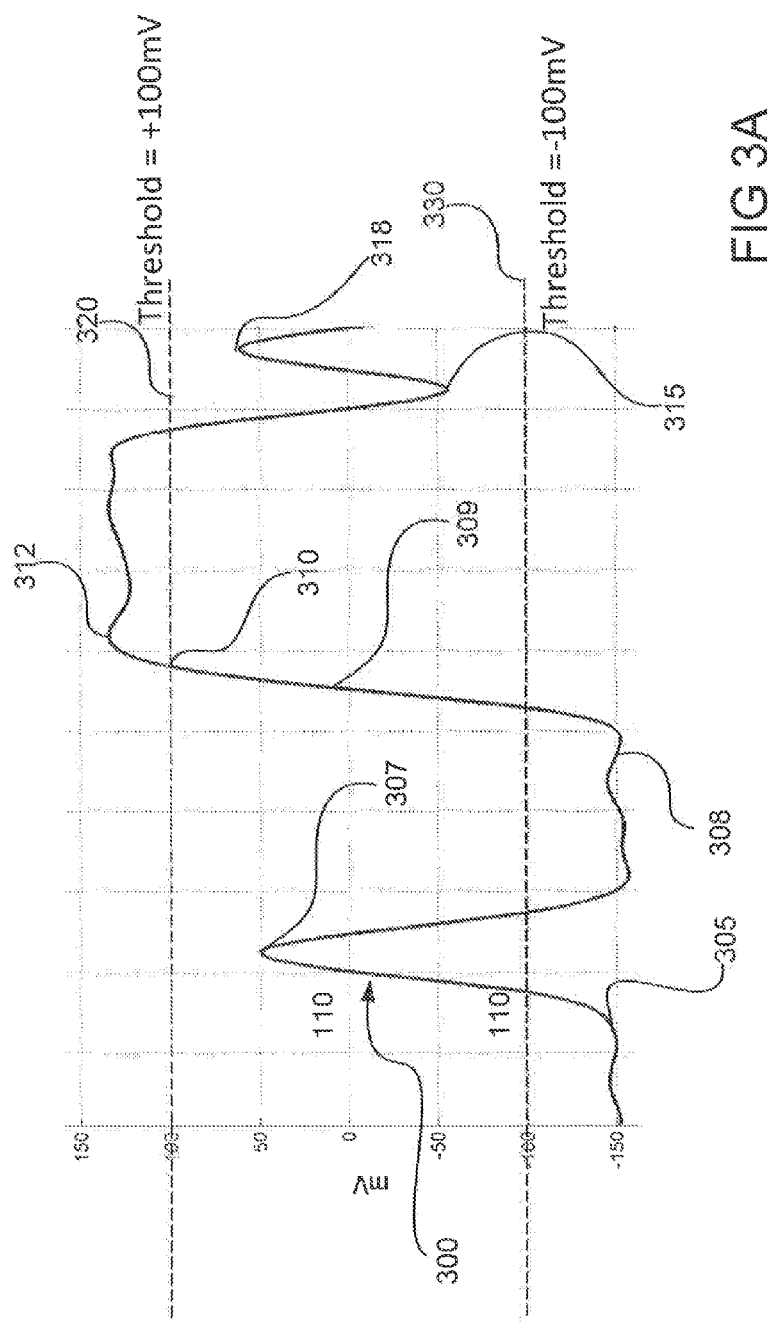
FIG. 3A is a signal diagram which illustrates a first signal and FIG. 3B illustrates the corresponding comparator output according to an embodiment.
Figure 3B:
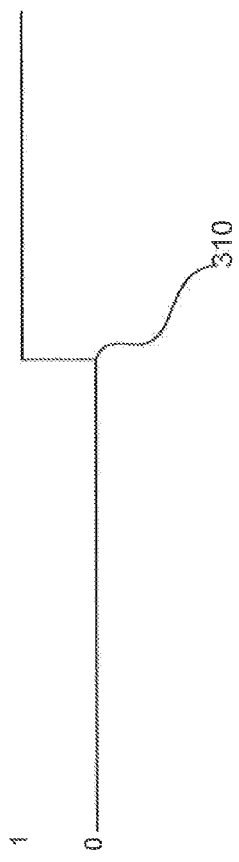

FIGS. 3 through 5 are signal diagrams which illustrate three different signals, and are used to discuss the comparator output for each signal. FIG. 3A illustrates a signal 300, and FIG. 3B illustrates the corresponding comparator output. The comparator 220 has Positive voltage threshold 320 of +100 mV and a negative voltage threshold 330 of −100 mV. The comparator output will be zero for signals that start below the negative threshold 330, until a transition occurs and the signal voltage crosses the positive threshold. Accordingly, at 305 the comparator output remains as zero. It is illustrative to note that at position 307, the signal voltage has crossed both the negative threshold 330 and the 0 mV level to have a positive signal voltage. However the comparator output remains at zero due to the hysteresis resulting from the positive and negative voltage thresholds. As the signal value drops from 307, the comparator output remains zero at 308. Position 309 is noteworthy as it shows a transition about to take place. At this point, the signal, which was below the negative threshold, is increasing and about to cross the positive threshold. The transition occurs at 310, as the signal voltage has now crossed both negative threshold 330 and positive threshold 320. Accordingly, the comparator output switches to 1 after this transition, and remains at 1 for the remainder of this Figure. Thus, the comparator output is 1 when the signal is above the positive threshold at 312. The comparator output remains at 1 at position 315 (despite the signal value dropping to a negative value) and 318 (despite the signal value again crossing the 0 mV level) due to hysteresis, as the signal has not had another transition (i.e., the signal has not dropped below the negative threshold 330, having previously exceeded the positive threshold 320).

FIG. 4A illustrates another signal 350 which has a low frequency data pattern with transitions at positions 352, 354, 356 and 358, and FIG. 4B illustrates the corresponding comparator output. The comparator output will be 1 at 351 and remain as 1 until transition 352, at which point the comparator output will switch to 0 once the signal drops below the negative threshold (having already crossed the positive threshold). The comparator output will then remain at 0 until transition 354, at which point the comparator output will switch to 1, and remain at 1 until transition 356, at which point the comparator output will switch to 0. The comparator output will then remain at 0 until transition 358, at which point the comparator output will switch to 1. FIG. 5A illustrates a noise signal, and the corresponding comparator output is illustrated in FIG. 5B. Although the noise crosses the positive threshold at positions 380 and 382, the signal never crosses both the positive and negative thresholds. Accordingly the comparator output will remain at 1 throughout as no transitions occur.

FIG. 6 is a block diagram illustrating another embodiment of a LOS circuit. This embodiment includes a second path for sampling the comparator output, in order to increase the robustness of the apparatus. In FIG. 6, the lower path shows a second DFF 610 which samples the output from comparator 220 using a clock ($Clk_\Phi$) shifted in phase by phase shifter 605. Phase shifter 605 can be a simple delay line, a variable delay line, an inverter, or any other phase shifting circuitry known in the art. In some embodiments a 90 or 180 degree phase shift may be utilized representing a quarter or half clock cycle respectively. When a half clock cycle is desired, an inverter may be used to implement the 180 degree phase shift. However it should be appreciated that other phase shifts can be used.

The second DFF 610 produces a second sampling stream which adds robustness to the system, by reducing the probability that the system will fail to detect a valid transition, as the sampling at either phase can potentially detect a transition that sampling at the other phase may miss. It should also be understood that more than two paths may be provided, with each path using a clock shifted by a different phase.

For example, two transitions separated by less than one clock cycle may not be detected by a single DFF due to the sampling frequency. The second path introduces a second sampling of the comparator output, such that if one path co-incidentally samples a symbol at the eye edge, then the other path will likely sample the symbol other than at the eye edge, to increase the likelihood of transition detection. In addition, as the DFF only detects transitions which are sampled at the rising edge of the clock signal, transitions which occur between clock cycles may not be detected. Thus, the second path, which samples with a phase shifted reference clock, samples the comparator output at different points, potentially detecting transitions which may be missed by use of only a single path. This will be discussed below, with reference to FIG. 7.

Each path in FIG. 6 includes a Demux element 620, 640. These elements are optional, depending on the speed of the signals being received, and the processing power of the digital components. For fast signals, the Demux element 620 acts as a serial-to-parallel converter, converting the sample stream received from DFF 230 into a plurality (N) of sample streams, using a clock rate equal to the Clk divided by N (clock divider not shown). This allows for a transition counter (with reset) 640 which can handle N parallel sample streams, which may be cheaper than a single counter which can operate at a sufficiently high speed to process the entire output from DFF 230 in a serial stream. Alternatively, N transition counters could each be used for one of the sample streams. The LOS circuit having a single path could likewise utilize such a Demux to accommodate faster input signal bandwidths, according to another embodiment. If this is the case, the transition counter, for example the transition counter 240 in FIG. 2, should count transitions in the parallel streams.

Transition counter (with reset) 640 counts the transitions which occur in the sample stream output from DFF 230, between resets. Transition counter (with reset) 645 counts the transitions which occur in the sample stream output from DFF 610, between resets. The higher transition count 650 is passed to a transition count comparator 660, which compares the number of transitions (per period between resets) with a threshold set to discriminate between an active signal and noise.

Figure 7:
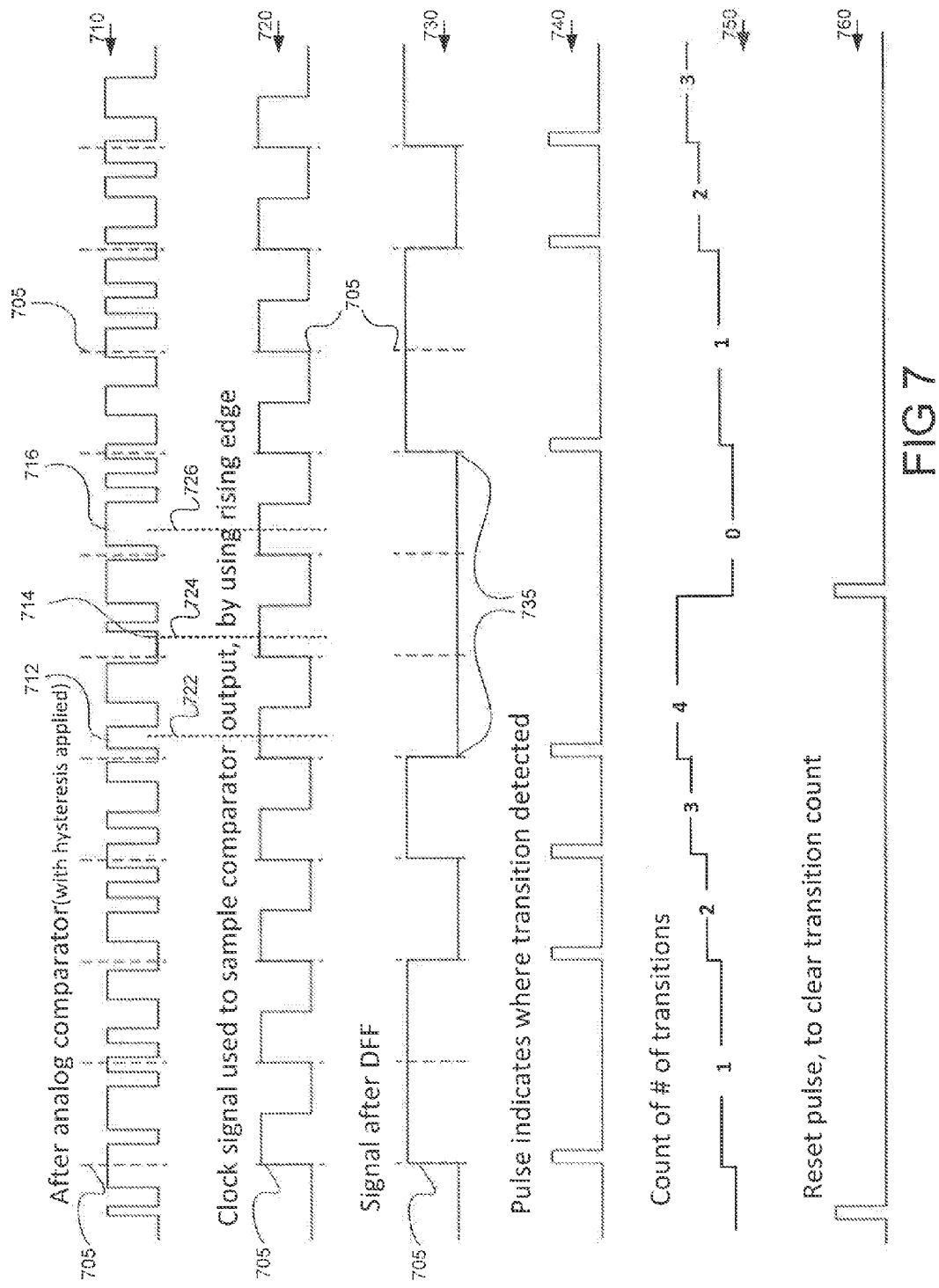
FIG. 7 conceptually illustrates how transitions are sampled and counted, utilizing idealized signal outputs for a single path, according to an embodiment.

FIG. 7 conceptually illustrates how transitions are sampled and counted, utilizing idealized signal outputs for a single path. It should be noted that FIG. 7 is conceptual in nature, and should not be taken to represent actual signals. In FIG. 7, a conceptual output from the comparator (with hysteresis) is shown 710. The internal reference clock signal, used to sample the comparator output, is shown at 720. A sample stream after sampling by the DFF is shown at 730. The pulses shown at 740 indicate where transitions are detected, and these detected transitions are counted by the transition counter 240. It should be noted that these pulses 740 do not represent any real signal, and are not actual outputs of either the DFF or the transition counter—but are merely included to help illustrate what is counted by the transition counter 240. Transition counter 240 counts changes (from 0 to 1 or from 1 to 0) in the sample stream output from DFF. Each such change increments the counter until a reset occurs, at which point the counter value is set to zero and starts incrementing again, as illustrated at 750 and 760.

Each change in the comparator output represents a transition (meaning the signal has crossed both the positive and negative voltage thresholds of the comparator). In FIG. 7 the dashed vertical lines (except for lines 722, 724 and 726) represent the rising edges of the clock signal. The dashed vertical lines 705 show one rising edge of the clock signal, and the corresponding sampling of the comparator output. Each such dashed vertical line represents a point where the DFF samples the comparator output. The output of the DFF changes if the comparator output at consecutive samples has changed, and remains the same if the comparator output at consecutive samples remains the same.

It should be appreciated that FIG. 7 conceptually illustrates a signal with rapid transitions (as can be seen by the many changes in the comparator output), in order to illustrate that not every one of these transitions need be counted. It is not necessary for the LOS to validly detect and count every transition, especially for a rapidly changing signal, as a rapidly changing comparator output would tend to indicate there is an active signal. The threshold of the transition count comparator 260 or 660 is configured such that the number of transitions actually detected and counted between resets is a good test of whether an active signal exists.

As stated, it is not necessary for the LOS circuit to detect and count every transition, especially for an active signal with many transitions, in order for the LOS circuit to validly determine that an active signal is present. However, the second path in FIG. 6 can help the robustness of the LOS circuit to detect and count transitions which do occur. This can be beneficial for detecting when an LOS condition does exist. With reference to FIG. 7, region 735 helps illustrate how the second path can help the robustness of the system. In this region, no transitions are detected by the DFF 230, despite several transitions occurring in the comparator output. This is due to the rising edge of the clock failing to detect a transition as each consecutive sampling is the same in this region (all zeroes). However, a second path sampling at the rising edge of the phase shifted clock represented by dashed vertical lines 722, 724 and 726, corresponding to comparator peak (1 value) at 712, trough (0 value) at 714 and peak (1 value) at 716, would detect (and count) a transition in this region.

Embodiments of a receiver incorporating a LOS circuit as described herein can include a controller 60 for taking appropriate action once a LOS condition has been reported. For example, such a controller 60 can send an alarm to the transmitter, or initiate a protection switch or restoration, depending on the situation and network. Advantageously, such a receiver can take such action faster than prior art systems, as the receiver does not need to wait for the CDR block to fail to recover the clock of the signal to determine the LOS condition exists. Further, the LOS circuit is fast, and relatively cheap in terms of components and power consumption. Indeed, as discussed above, embodiments can be configured that need not even detect every transition, which may offer a simpler architecture than receivers which need to decode every bit before a LOS condition can be detected. Further, embodiments can use relatively low power in order to discriminate between an active signal and a LOS condition. Such embodiments may be useful for systems which use non-continuous transmissions, or where power or heat dissipation is an issue. The LOS can quickly determine the presence of a signal, and activate the relatively higher power CDR portion of the receiver only when needed. Another advantage of some embodiments is that the LOS circuit can discriminate between a weak signal (with a relatively large amount of noise) and a LOS, which has been a problem for some prior art LOS circuits, including those which rely on a peak detector or power detector (also called a root-mean-square power detector).

FIG. 8 illustrates a method of detecting a LOS condition carried out by a receiver, according to an embodiment. An incoming signal is sampled for transitions which occur when the signal level of the signal crosses both a first reference threshold and a second reference threshold 810. This sampling is done using an asynchronous internal reference clock (internal to the receiver), which need not be synchronized in phase or frequency to a clock which generated said signal (if present). The number of transitions within a period of time are counted 820 and compared with a threshold 830. If the counted number exceeds the threshold, then an active signal is deemed present. Otherwise, a LOS condition is declared 840. In some embodiments, the second reference threshold is the negative value of the first reference threshold. In some embodiments the signal level is measured by measuring the voltage of the signal, and comparing the measured voltage against first and second reference voltage thresholds.

The methods and devices described herein are generally applicable to receivers which attempt to differentiate signals from noise, and in particular where noise typically is bounded by upper and lower voltage thresholds, but for which active signals cross said thresholds. Embodiments may be of particular value for receivers embodied in a card in networking or computer equipment which includes a plurality of cards connected by a backplane, in which the backplane is a source of crosstalk noise, in which case the reference voltages can be selected to differentiate between an active signal and said crosstalk noise. Embodiments may also be implemented in receivers for optical, cable, and other transmission systems. The LOS circuit can be embodied in FPGA, ASIC, CMOS, DSP or other chip, which can be used with a receiver or incorporated into a receiver, which may itself incorporate one or more processors and other chips.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

The invention claimed is:

1. A receiver comprising:
   a signal receive interface for receiving an incoming signal;
   an internal reference clock source for producing an internal reference clock signal, said internal reference clock signal being asynchronous to a clock rate of said incoming signal; and
   a loss of signal (LOS) circuit which samples said incoming signal utilizing said internal reference clock signal to determine whether a loss of signal condition has occurred;
   said LOS circuit comprising:
   an analog threshold stage which samples said incoming signal, and produces at least one sample stream indicative of transitions in said incoming signal; and
   a digital transition stage which counts transitions in said at least one sample stream in order to discriminate between an active signal and a loss of signal condition
   wherein a transition occurs when a signal value of said incoming signal crosses a first reference threshold and a second reference threshold; and
   wherein said analog threshold stage comprises:
   a level comparator for comparing said input signal with said first and second reference thresholds;
   a first circuitry coupled to the output of said comparator and said internal reference clock signal for sampling the output from the comparator; and
   a second circuitry coupled to the output of said comparator and a phase shifted version of the internal reference clock signal for sampling the output from said comparator.

2. The receiver as claimed in claim 1 wherein said analog stage produces first and second sample streams, wherein the second sample stream is sampled using a phase shifted version of the internal reference clock signal; and wherein said digital transition stage includes a counter for counting transitions in each of said first and second sample streams.

3. The receiver as claimed in claim 2 wherein said digital transition stage further comprises a comparator for comparing the counted transitions in said first and second sample streams.

4. The receiver as claimed in claim 1 wherein said digital transition stage comprises:

a first transition counter element which counts transitions in samples received from said first circuitry;

a second transition counter element which counts transitions in samples received from said second circuitry; and a transition count comparator which compares counted transitions within a period of time with a threshold and provides an output signal indicative of whether said incoming signal includes an active signal.

5. The receiver as claimed in claim 4 wherein said level comparator is a level comparator with hysteresis and wherein said first circuitry comprises a first data flip flop and wherein said second circuitry comprises a second data flip flop.

6. The receiver as claimed in claim 4 wherein said analog threshold stage further comprises:

a first demux element for converting the serial sample stream from the first circuitry into a first plurality of parallel sample streams; and a second demux element for converting the serial sample stream from the second circuitry into a second plurality of parallel sample streams;

and wherein, said first transition counter element counts transitions in said first plurality of parallel sample streams; and said second transition counter element counts transitions in said second plurality of parallel sample streams.

7. The receiver as claimed in claim 6 embodied in a card in networking equipment which includes a plurality of cards connected by a backplane, and said backplane is a source of crosstalk noise, and wherein said first and second reference thresholds are selected to differentiate between an active signal and said crosstalk noise.

8. The receiver as claimed in claim 1 wherein said receiver further comprises a clock recovery circuit for recovering the clock of said incoming signal, and said LOS circuit operates independently of said clock recovery circuit.

9. The receiver as claimed in claim 1 in which the first and second threshold are positive and negative values of a single threshold.

10. A loss of signal (LOS) circuit comprising:

an analog threshold stage which samples an incoming signal, and produces at least one sample stream indicative of transitions in said incoming signal; and a digital transition stage which counts transitions in said at least one sample stream in order to discriminate between an active signal and a LOS condition;

wherein said analog threshold stage samples said incoming signal utilizing a reference clock which is asynchronous to a clock rate of said incoming signal;

wherein said analog threshold stage is configured to sample said incoming signal to produce samples indicative of transitions which occur when the signal level of said incoming signal crosses both a first reference threshold, and a second reference threshold; and wherein said analog threshold stage comprises:

a level comparator for comparing said input signal with said first and second reference thresholds;

a first circuitry coupled to the output of said comparator and said internal reference clock signal for sampling the output from the comparator; and a second circuitry coupled to the output of said comparator and a phase shifted version of the internal reference clock signal for sampling the output from said comparator.

11. The LOS circuit as claimed in claim 10 wherein said analog stage produces at least one additional sample stream which is sampled by a phase shifted reference clock in order to increase likelihood that at least one sample detects a transition; and wherein said digital transition stage includes a counter for counting transitions in each of said sample streams, and a comparator for comparing the counted transitions in said sample streams in order to discriminate between an active signal and noise.

12. The LOS circuit as claimed in claim 10 wherein said digital transition stage comprises:

a first transition counter element which counts transitions in samples received from said first circuitry;

a second transition counter element which counts transitions in samples received from said second circuitry; and a transition count comparator which compares counted transitions within a period of time with a threshold and provides an output signal indicative of whether said incoming signal includes an active signal.

13. The LOS circuit as claimed in claim 12 wherein said analog threshold stage further comprises:

a first demux element for converting the serial sample stream from the circuitry into a first plurality of parallel sample streams; and a second demux element for converting the serial sample stream from the second circuitry into a second plurality of parallel sample streams;

and wherein, said first transition counter element counts transitions in said first plurality of parallel sample streams; and said second transition counter element counts transitions in said second plurality of parallel sample streams.

14. The LOS circuit as claimed in claim 13 wherein said level comparator is a level comparator with hysteresis and wherein said first circuitry comprises a first data flip flop and wherein said second circuitry comprises a second data flip flop.

15. The LOS circuit as claimed in claim 10 wherein said first threshold is a positive value and said second threshold is a negative value.

16. A method of detecting a Loss of Signal (LOS) condition carried out by a receiver comprising:

sampling an incoming signal, using an asynchronous internal reference clock internal to the receiver, for transitions which occur when the signal level of the incoming signal crosses both a first reference threshold and a second reference threshold;

counting the number of transitions within a period of time; and comparing said counted number of transitions with a threshold to discriminate between an active signal and a LOS condition;

wherein said asynchronous internal reference clock is asynchronous to a clock which generated an active signal if present;

wherein said sampling comprises:

comparing said input signal with said first and second reference thresholds using a comparator;

sampling the output from the comparator; and sampling the output from said comparator using a shifted version of the internal reference clock.

17. The method as claimed in claim 16 wherein said sampling produces a pair of sample streams, one of which is sampled by a phase shifted internal reference clock in order to increase likelihood that at least one of each pair of samples detects a transition; and wherein said counting counts transitions in each of said pair of sample streams.

18. The method as claimed in claim 17 wherein said sampling comprises sampling the output of a level comparator with hysteresis which compares said incoming signal with said reference voltage thresholds.

19. The method as claimed in claim 18 wherein said sampling is carried out by a first Flip Flop coupled to the output of said comparator and said internal reference clock signal for sampling the output from the comparator with said internal reference clock and by a second Flip Flop coupled to the output of said comparator and said phase shifted internal reference clock signal for sampling the output from the comparator with said phase shifted internal reference clock.

20. The method as claimed in claim 18 wherein said counting comprises counting the transitions in each of said pair of sample streams; and wherein said comparing comprises first comparing the count of each sample stream to produce a total count equal to the higher of number of transitions within said pair of sample streams, and then comparing said total count with said threshold to discriminate between an active signal and a LOS condition.

* * * * *